United States Patent [19]
Yamazaki et al.

[11] Patent Number: 5,625,772
[45] Date of Patent: Apr. 29, 1997

[54] GRAY-SCALE FONT GENERATING APPARATUS UTILIZING A BLEND RATIO

[75] Inventors: Naomi Yamazaki, Takahagi; Atsushi Kawabata, Hitachi, both of Japan

[73] Assignee: Hitachi, Ltd., Tokyo, Japan

[21] Appl. No.: 925,653

[22] Filed: Aug. 7, 1992

[30] Foreign Application Priority Data

Aug. 8, 1991 [JP] Japan .................. 3-199154

[51] Int. Cl.$^6$ .................. G06F 15/00; G09G 5/24
[52] U.S. Cl. .................. 395/167; 345/141
[58] Field of Search .................. 348/254; 345/141, 345/142, 143, 144, 147; 395/150, 151

[56] References Cited

U.S. PATENT DOCUMENTS

| | | | |
|---|---|---|---|
| 4,851,825 | 7/1989 | Naiman | 395/151 |
| 4,908,780 | 3/1990 | Priem et al. | 395/135 |
| 5,068,803 | 11/1991 | Valdes et al. | 395/150 |
| 5,123,085 | 6/1992 | Wells et al. | 395/121 |
| 5,276,790 | 1/1994 | Lo et al. | 395/150 |

FOREIGN PATENT DOCUMENTS 63-313191  6/1987  Japan .

*Primary Examiner*—Heather R. Herndon
*Assistant Examiner*—Joseph R. Burwell
*Attorney, Agent, or Firm*—Antonelli, Terry, Stout & Kraus, LLP

[57] ABSTRACT

A gray-scale display device such as a general display for a personal computer or work station, a laser printer or a color printer. A gray-scale font generating apparatus used in the display device includes an input unit for inputting the information representative of a font code, and control unit for acquiring a blend ratio in accordance with the ratio of a font area and a background area in the contour of the shape data of the font corresponding to the information representative of a font code, and making the gradation display of the font with the blend ratio thus acquired. Since the blend ratio is acquired without using work memory, a gray-scale font can be created and output at high speed.

13 Claims, 13 Drawing Sheets

BLEND RATIO

100%

75%

50%

25%

CONTOUR OF FONT

MASK PATTERN

ON ▨
OFF ☐

SUB-PIXEL   DOT

FIG. 15(a) BINARY DIGIT
PRIOR ART
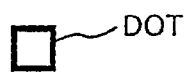
DOT
FIG. 15(b) 4-GRADATION
PRIOR ART
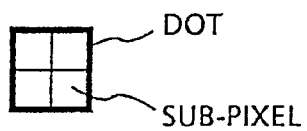
DOT
SUB-PIXEL
FIG. 15(c) 16-GRADATION
PRIOR ART
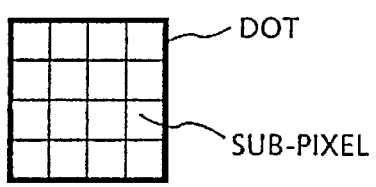
DOT
SUB-PIXEL
FIG. 15(d) 64-SCALE
PRIOR ART
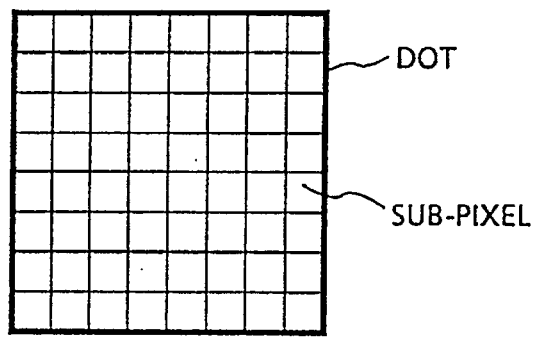
DOT
SUB-PIXEL

GRAY-SCALE FONT GENERATING APPARATUS UTILIZING A BLEND RATIO

BACKGROUND OF THE INVENTION

The present invention relates to a gray-scale font generating apparatus in a gray-scale display device such as a general display for a personal computer or work station, a laser printer or a color printer.

As shown in FIG. 8, the term "gray-scale font" is a font with dots at the contour of a font being gradation-displayed by an intermediate gradation between font color and background color. This font permits a small font to be displayed clearly and a large font to have no irregularities at its inclined portions.

For this reason, a font which is the gray-scale font will not be deformed when its display position is shifted slightly.

The gray-scale font can be generated in such a way that the proportion of a font area (blend ratio) in a dot area in each of the dots located at the contour portion of the font is calculated, and background color and font color are blended in the calculated blend ratio to determine the color of the dots at the contour of the font.

Conventionally, in order to calculate the blend ratio for each of the dots constituting a font on the basis of vector font information, the following processing is carried out. First, vector data of a font is read and developed. The developed font is written or drawn to be superposed on a sub-pixel pattern supposed on a vast size of work memory for calculation assured previously (the sub-pixel pattern is composed of sub-pixels 32 obtained when one dot is divided in a matrix form). Namely, the sub-pixels 32 within a contour line 33 of the font are "painted over" as shown in FIG. 3. The number of the sub-pixels painted over is counted to be totaled for each dot. Thus, the proportion of the font area (blend ratio) for each of all the dots constituting the font can be calculated on the basis of (the number of the painted-over sub-pixels÷the total number of the sub-pixels). The related art is disclosed in JP-A-63-313191.

In this way, in the conventional blend ratio calculating method, a font is once written on a work memory with sub-pixels when one dot is sub-divided by a factor of several, and the state after writing must be examined for each dot to count the number of the painted sub-pixels. Such processing takes a long time. In this case, as the number of gradation increases, the number of sub-pixels in each dot, i.e., size of the work memory which is required in processing of once writing the font increases proportionately (for example, as shown in FIG. 15, four gradations result in four times of a binary digit; 16 (sixteen) gradations result in 16 times; and 64 gradations result in 64 times). This also increases the processing time. Thus, a vast size of work memory which is not practical must be secured.

In short, the above prior art, in which in order to calculate the proportion of a font region in each of the dots constituting a font, the output font is once written on a work memory consisting of sub-pixels obtained when each dot is sub-divided by a factor of several, has the problem that a vast size of work memory must be prepared.

The prior art, in which the size of memory varies greatly with the number of gradations, has also the problem that it is not practical.

The prior art, in which the state after writing must be examined for each dot to count the number of painted-over sub-pixels, also has the problem that the time taken for the writing and counting is long and the processing time varies greatly with the size of a font and the number of gradations.

SUMMARY OF THE INVENTION

A primary object of the present invention is to calculate the proportion of a font region in each of the dots constituting a font by only the processing a numerical calculation without doing the entire processing of once writing the font on work memory, thereby making it unnecessary to secure a large work memory, decreasing the time taken for writing and counting for each dot, and creating a gray-scale font at high speed.

Another object of the present invention is to individually store the mask pattern representative of the region where a font is present and a blend ratio, and to manage the blend ratio by the necessary and minimum number of dots, thereby reducing the necessary amount of memory.

The first feature of the present invention resides in that the blend ratio for each dot can be calculated by only the processing of addition, subtraction and shift operation without doing the processing of writing a font on work memory and counting which was conventionally an obstruction to high speed processing, thereby permitting the blend ratio to be calculated at high speed.

The second feature of the present invention resides in that provision of blend ratio storage means for once storing the blend ratio permits the calculated blend ratio to be used again, thereby outputting a gray-scale font at high speed.

The third feature of the present invention resides in that the blend ratio storage means stores the mask pattern representative of the region where a font is present, separately from the blend ratio, thereby making the blend ratio easy to manage.

In accordance with the first feature of the present invention, in order to output a font, a series of operations of reading vector data of the font, calculating the blend ratio and blending are required.

First, vector data of a font is read and developed.

Next, in order to calculate the blend ratio, points of intersection of the contour of the developed font with each of horizontal lines, and the area occupied by a font region in each dot are approximated by only the of numerical calculation processing necessary to calculate the blend ratio. Thus, blend ratio calculating means can calculate the blend ratio at high speed.

Using the blend ratio calculated by the blend ratio calculating means, blending means blends the color designated as font color and background color to determine gradation color to be output.

As a result, the processing of calculating the blend ratio for each dot which was necessary for each output in the prior art can be performed at high speed so that the gray-scale font can be output at high speed.

In accordance with the second feature of the present invention, if the blend ratio calculated by the blend ratio calculating means is stored in the blend ratio storage means so that it is used repeatedly, the same font with the same size with different background colors and font colors can do without the same blend ratio calculating processing.

Accordingly, in accordance with the gray-scale font generating apparatus according to the present invention, the following advantages can be obtained.

The blend ratio for each dot, which can be calculated by only numerical calculation, can be acquired at high speed.

The processing of only numerical calculation permits the blend ratio to be acquired without using work memory for calculation.

Thus, since the blend ratio can be calculated at high speed, the memory can be reduced and a gray-scale font can be output at high speed.

The blend ratio calculating processing, if it is not performed by software but is incorporated in LSI, can be performed at a much higher speed than in the prior art.

If the mask pattern representative of the region where a character is present is stored separately from the blend ratio, the blend ratio can be easily managed.

If the calculated blend ratio is stored in the blend ratio storage means only when a font is first required, the same font, when required again, can be used again. This permits a gray-scale font to be output at high speed.

If the time when the blend ratio information for a font stored has been managed previously, the font with a low output requirement frequency can be searched when the area of storing the blend ratio information for the font has been lost. This permits fonts with high using frequency to be always stored and so a gray-scale font to be output at high speed.

BRIEF DESCRIPTION OF THE DRAWINGS

FIG. 15 is a view showing how the size of the work memory increases as the number of gradations varies.

DESCRIPTION OF THE PREFERRED EMBODIMENTS

Figure 1:
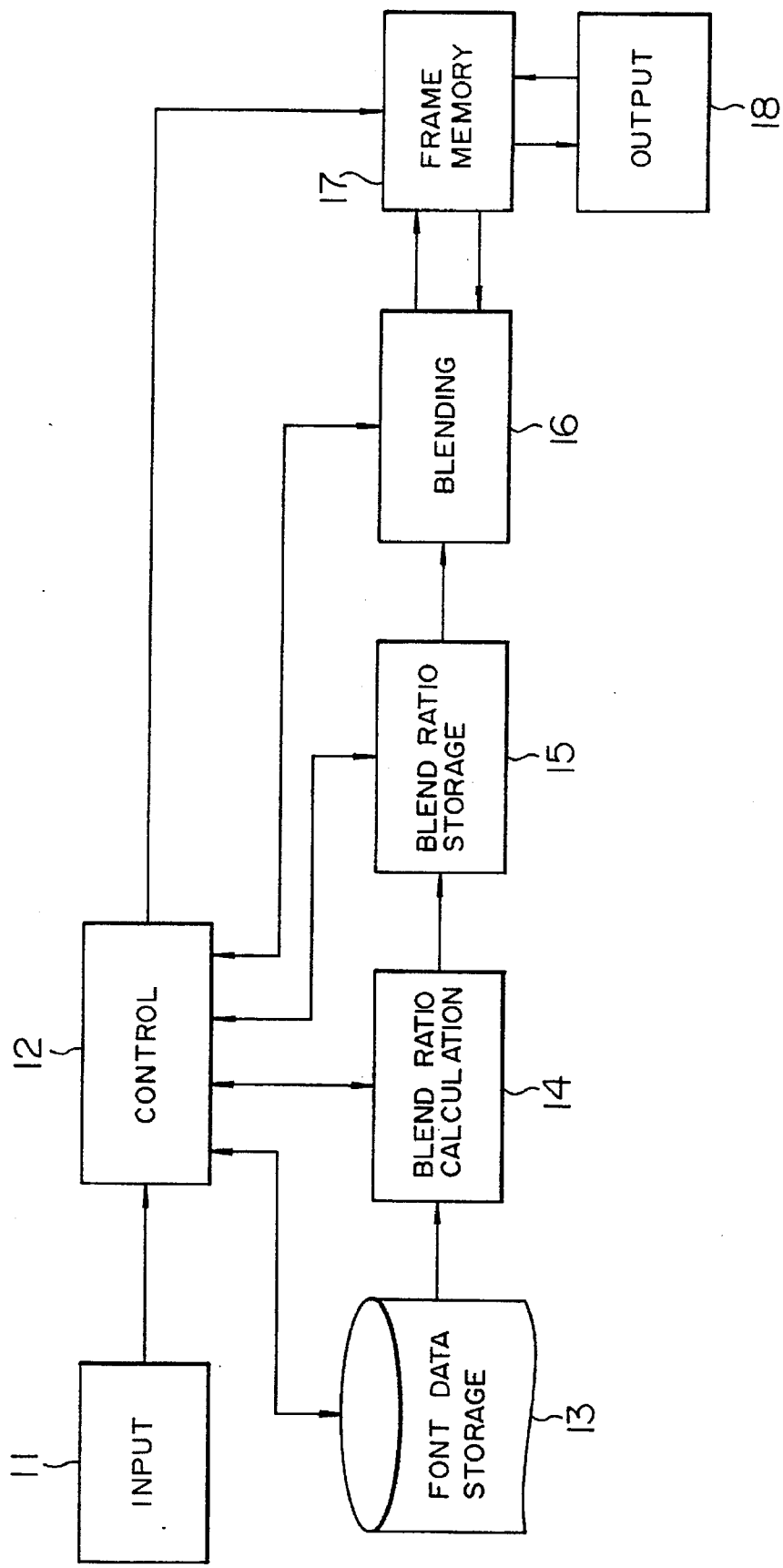
FIG. 1 is a block diagram showing a system according to the present invention.

Now referring to the drawings, an explanation will be given of several embodiments of the present invention.

FIG. 1 is a block diagram of the system arrangement of one embodiment of the present invention.

Reference numeral 11 denotes an input device (e.g. a keyboard and mouse) for inputting font codes; 12 a control device for controlling a series of processing steps; 13 a font data storage device for storing font data; 14 a blend ratio calculation device for calculating the color blend ratio of a font to a multi-figure for each dot; 15 a blend ratio storage device for once storing the blend ratio for each dot calculated by the blend ratio calculating device; 16 a blending device for actually executing the blending on the basis of the blend ratio stored previously in said blend ratio storage device; 17 a frame memory device on which the gray-scale font created by said blending means is written; and 18 an output device for outputting the image information written on the frame memory, e.g., a display device and a printer.

The operation of each component in the above system arrangement will be explained.

First, a font required to be output is input by the input device 11. The control device 12 reads the data of the required font from the font data storage device 13. The blend ratio calculation device 14 develops the font data to calculate the blend ratio which is the proportion of a font region in each of the dots constituting the required font. The blending device 16 blends, for color blending in each of the dots constituting the font, a font color and a background color in the blend ratio calculated for each dot, thus creating a gray-scale font. The frame memory 17 writes the gray-scale font created by the blending device.

The blend ratio storage device 15 serves to store once the blend ratio calculated by the blend calculation device 14.

The blend ratio calculation device 14 calculates, as a blend ratio, the proportion of a font region in each of the dots constituting the font, and sets the calculated blend ratio for 0% to 100%. The blending device 16 can blend the color designated as a font color and a background color to acquire a gradation color which corresponds to the proportion of a font region in each dot. Particularly, this gradation color gives the contour portion and slanted line portion of the font a natural color tone considering the background color, thus providing a display result with no irregularities at the slanted line portion.

Figure 9:
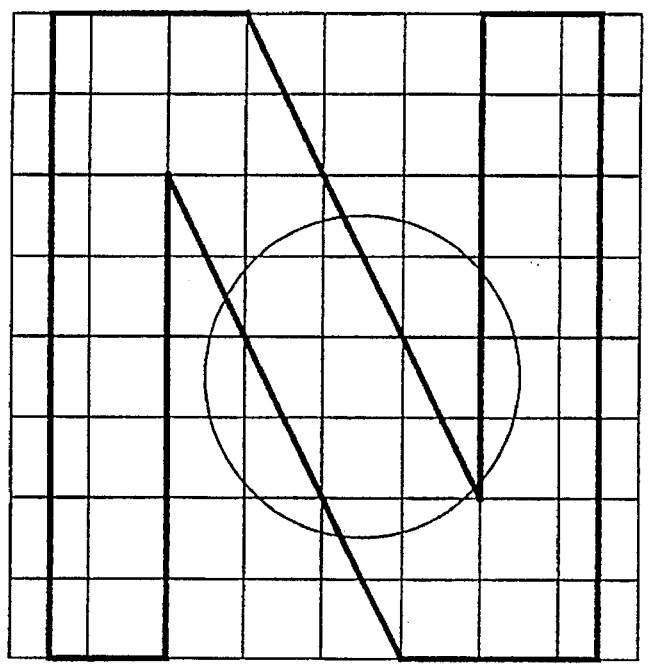
FIG. 9 is a view showing the font vector data on a dot pattern.
Figure 12:
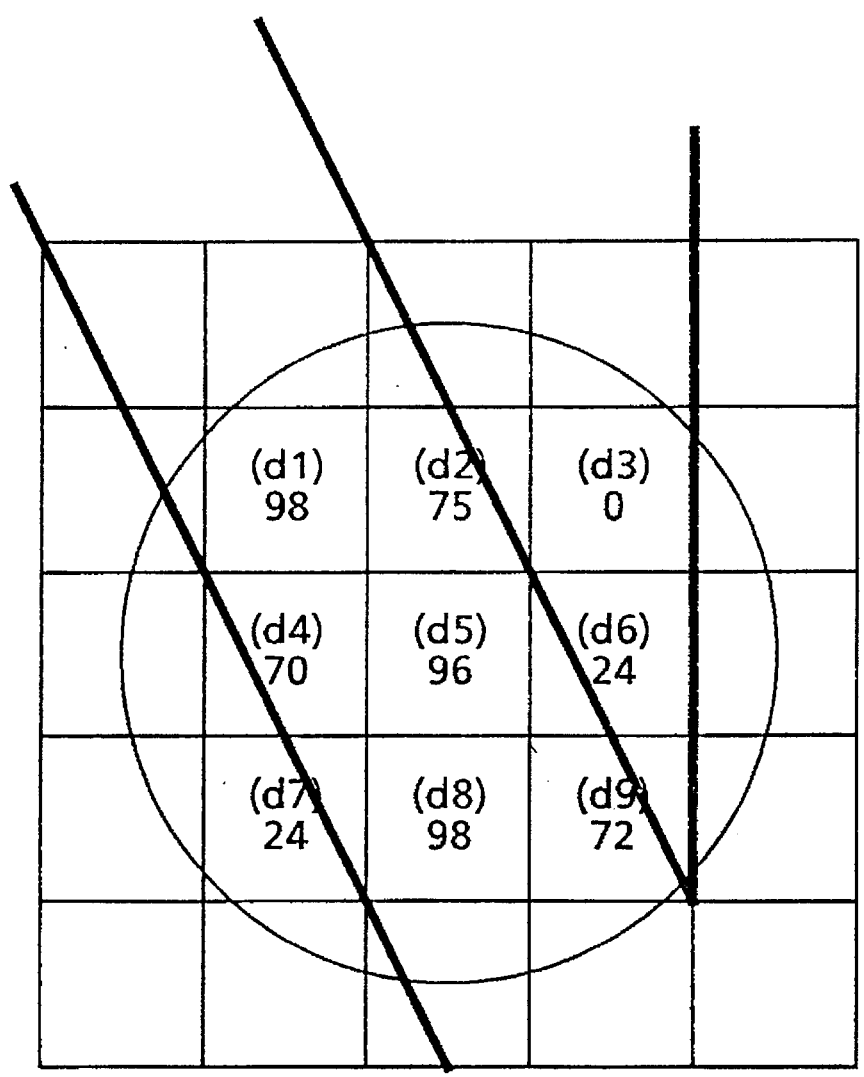
FIG. 12 is a view showing the area proportion of a font region in a dot.

Referring to FIGS. 9 and 12, an explanation will be given of the operation of the blend ratio calculation device 14.

FIG. 9 shows pixels displayed on a dot pattern. The font data storage device 13 previously stores therein the contour coordinate data of several kinds of fonts including that of e.g., the letter "N" within the dot pattern. The contour font coordinate data represents font vector data.

FIG. 12 shows the display corresponding to the circle shown in FIG. 9 in which the font vector data has been read to be superposed on the dot pattern. Specifically, FIG. 12 shows the area proportion of a font region calculated for each dot (the blend ratio=the area occupied by a font region÷the area of one dot).

The blend ratios are 98% for dot d1, 75% for dot d2, 0% for dot d3, 70% for dot d4, 96% for dot d5, 24% for dot d6, 24% for dot d7, 98% for dot d8, and 72% for dot d9.

The blend ratio calculation device 14, which calculates the blend ratio for each of the dots constituting a font on the basis of the equation: (the area occupied by a font region÷area of one dot), can provide the blend ratio which accurately reflects the proportion occupied by the font region in each dot.

Figure 2:
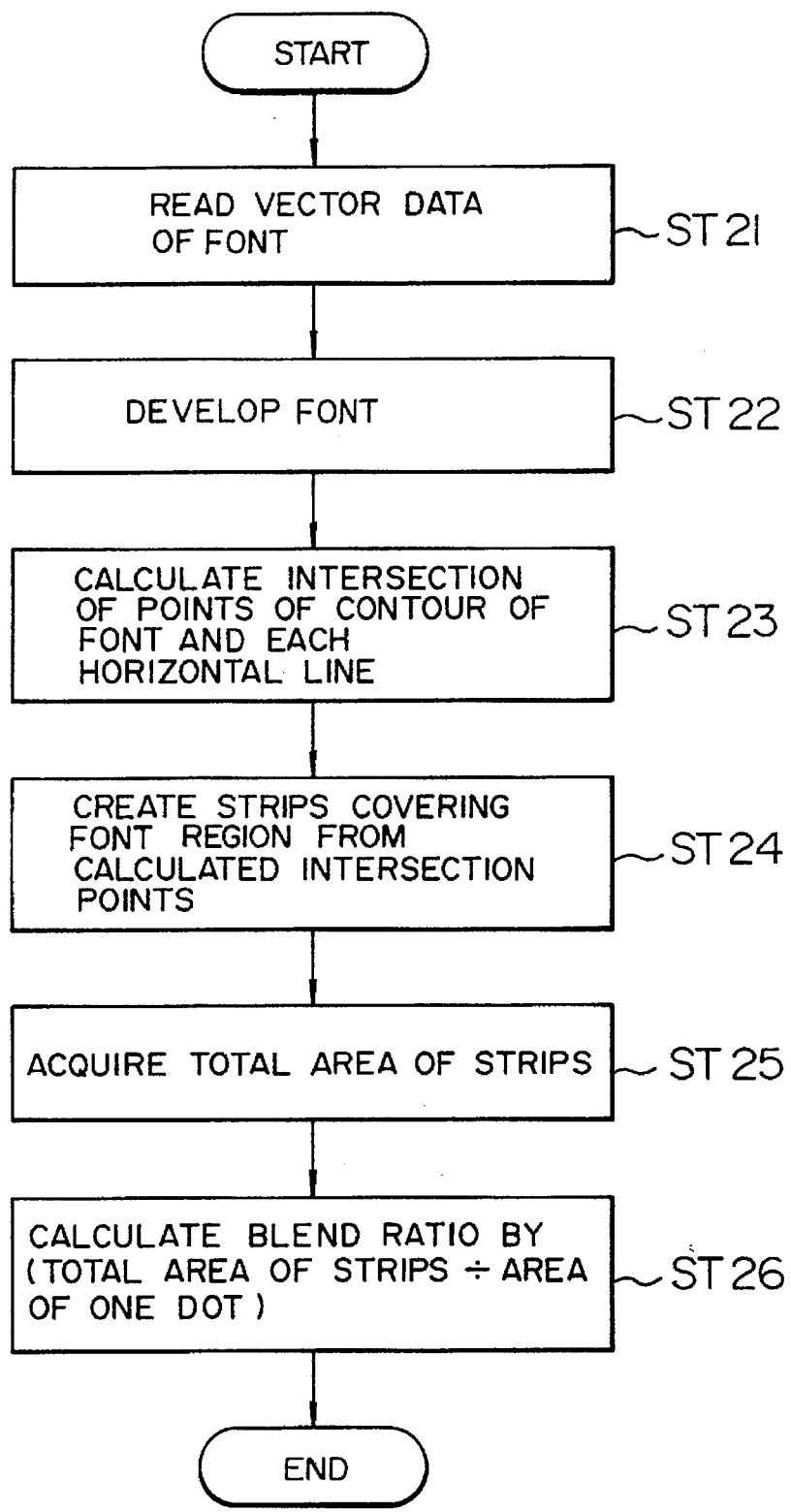
FIG. 2 is a flowchart showing the processing procedure in the first embodiment of the present invention.
Figure 3:
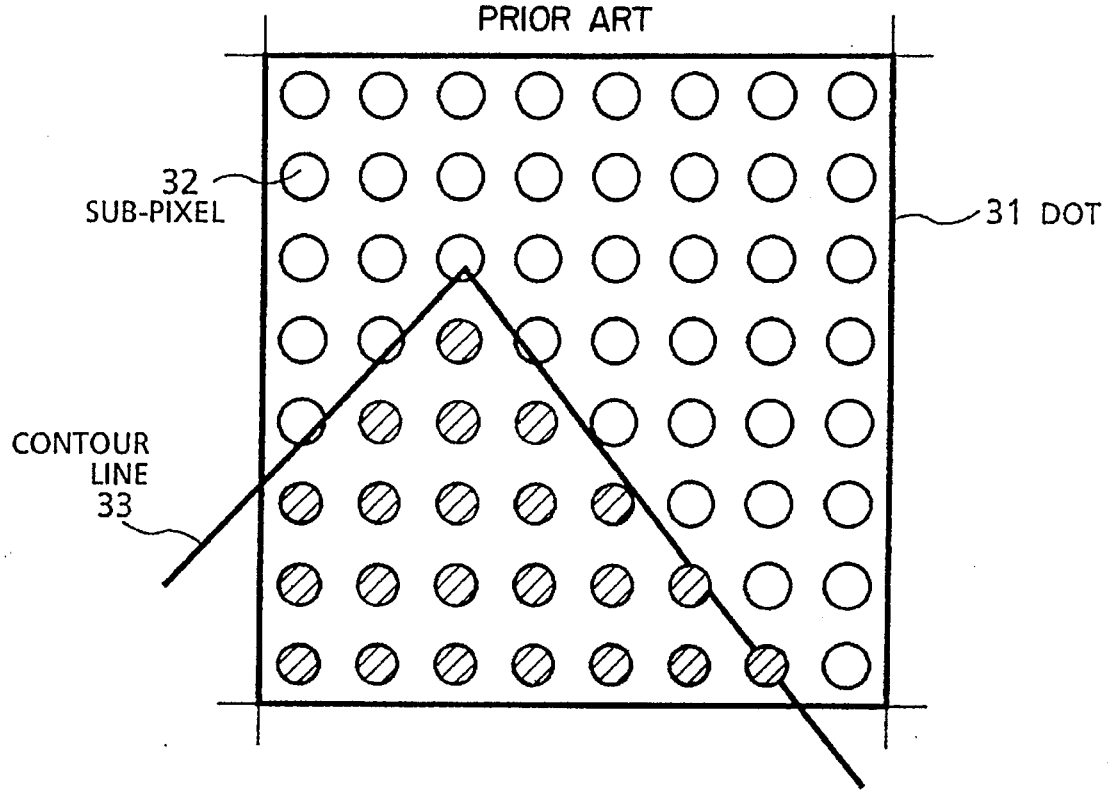
FIG. 3 is a view for explaining the conventional blend ratio calculation processing.
Figure 4:
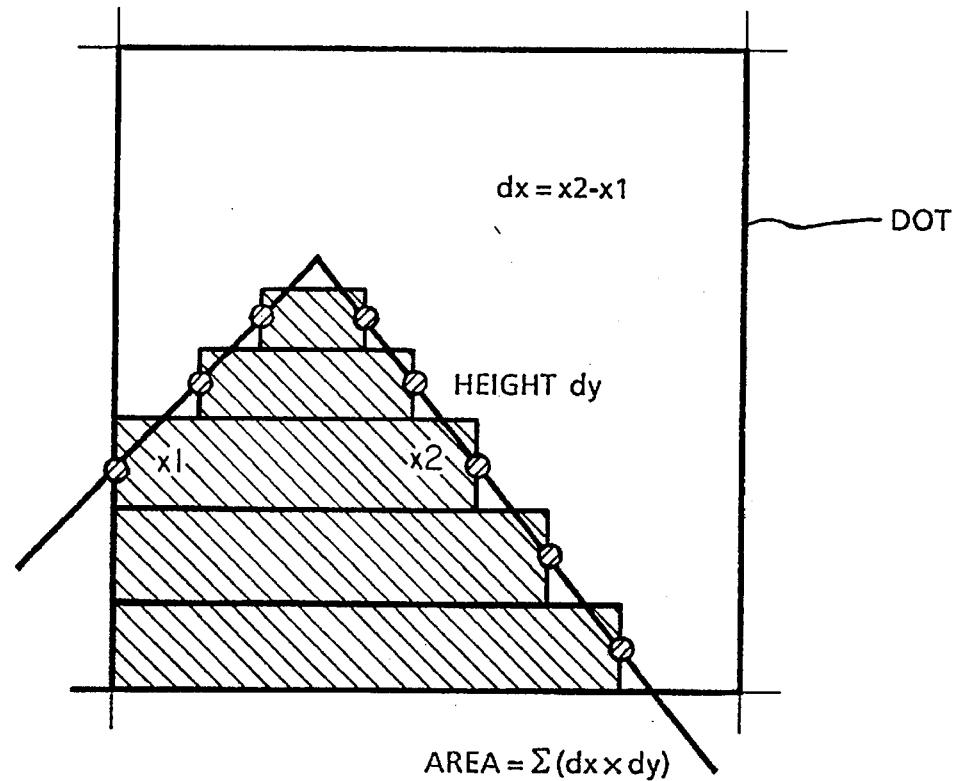
FIG. 4 is a view for explaining the blend ratio calculation processing according to the present invention.

FIG. 2 shows one embodiment of the processing flow in the blend ratio calculation device 14, and as depicted in FIG. 4.

In step ST21, vector data of a font is read. In step ST22, the vector data of the font is developed to create the contour of the font. In step ST23, horizontal lines when one dot is divided horizontally into parts, the number of which corresponds to the number of gradations, are generated and points of intersection of the font contour and each horizontal line are calculated. In step ST24, individual strips covering the font region from the intersection points are taken. The height by of each strip, which depends on the number of divisions, can be determined uniformly. The width dx of a certain strip can be easily determined on the basis of dx=x2−x1 (x1 and x2 represent positions of the corresponding intersection points in the horizontal direction, see FIG. 4). In step ST25, the area of each strip is calculated by dx×dy, and the total area of all strips in the dot. In step ST26, the blend ratio is calculated from (the total area of the strips÷the area of one dot).

In accordance with this embodiment, the blend ratio can be calculated without writing a font on a work memory unlike the prior art so that the time taken to calculate the blend time can be reduced. A work memory of a vast size, therefore, is not required to be secured work memory is not required to be secured.

In this embodiment, if the processing of calculating the blend ratio is not performed where the entire dot is covered with the font region or not entirely covered, only the processing for the contour of a font has to be performed, thereby permitting a gray-scale font to be created at high speed.

Figure 5:
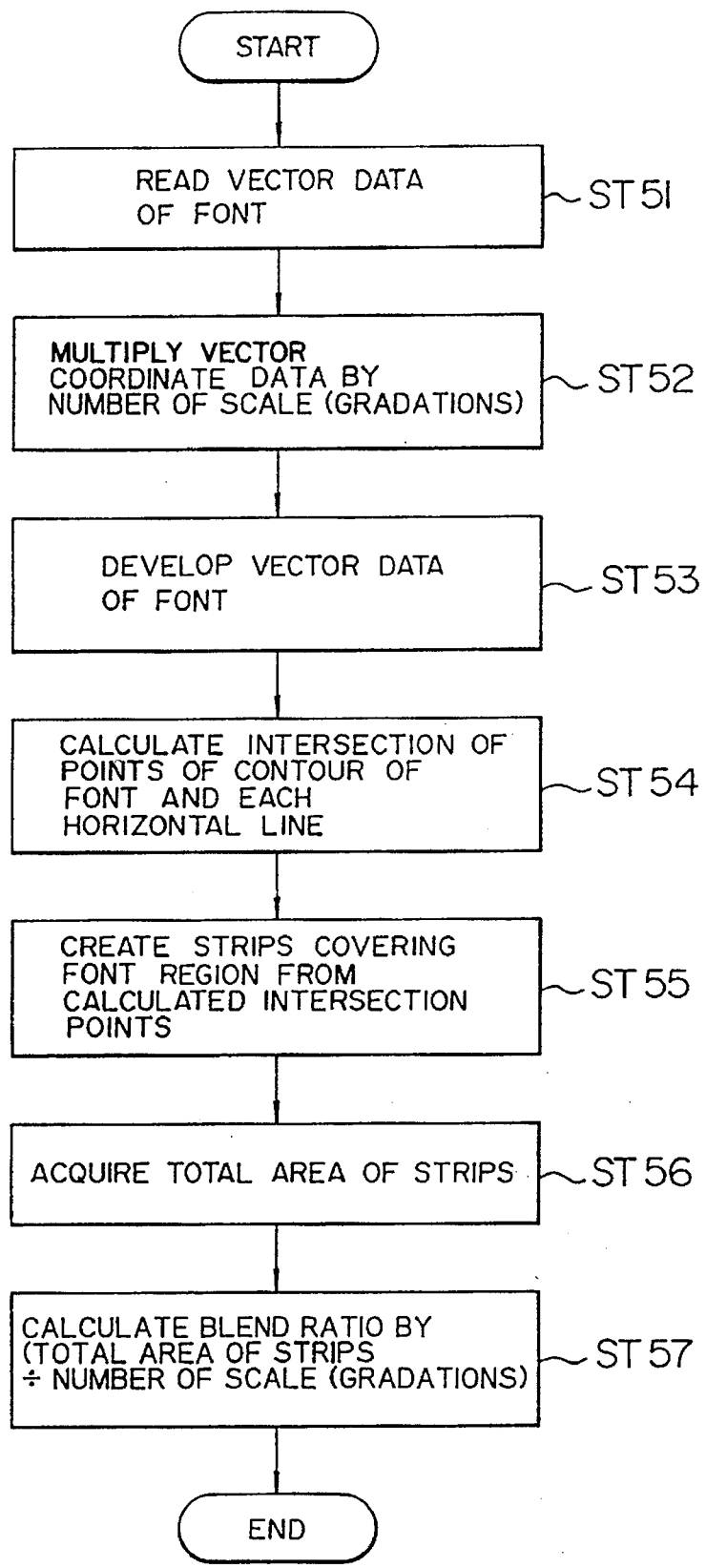
FIG. 5 is a flowchart showing a modification of the processing procedure in the first embodiment of the present invention.

FIG. 5 shows a modified embodiment of the processing flow in the blend ratio calculation device 14.

It should be noted that the height dy of the strip in the above embodiment is adjusted to be 1 (unity).

In step ST51, the vector data of a font is read. In this embodiment also, strips are made in the same manner as in the above embodiment. However, in this embodiment, in step ST52, the vector coordinate data is previously enlarged to a multiple equal to the number of gradations. The number of gradations is usually represented by the power of 2, e.g. 2, 4, 16, 64 and 256. The data is enlarged in such a manner that they are shifted by 1, 2, 4, 6 and 8 bits, respectively. In step ST53, the vector data of the enlarged font is developed to create the contour of the font. In step ST54, horizontal lines are generated for each dot, and points of intersection between the font contour line and the horizontal line are calculated. In step ST55, strips covering the font region from the intersection points are created. The height dy of each of the strip, which has been previously adjusted to be 1 by step ST52, is 1 uniformly. The width dx can be calculated from the intersection points x1 and x2. In step ST56, the area of each strip is calculated. The area of each strip, since the height of the strip is 1, is equivalent to the width of the strip. The total area of all of the strips is the total of the widths of all of the respective strips. In step ST57, the blend ratio is calculated on the basis of (the total area of strips÷the area of the enlarged dot) since the vector coordinate data has been enlarged to a multiple equal to the number of gradations. Then, the area of enlarged one dot is represented by the power of 2 as described above, so that the division operation can be executed by shifting bits.

In accordance with this embodiment, since the vector coordinate data has been enlarged to a multiple equal to the number of gradations, only addition/subtraction of integers and a shifting operation have to be done to acquire the area of each strip and the total area of all the strips. This simplifies the calculation and so reduces the calculation time.

In this modified embodiment also, a vast size work memory of vast size is not required.

In the two embodiments described above, because of the processing for each horizontal line, enlargement of the font size will not greatly increase the processing time.

In this embodiment also, as in the previous embodiment, if the processing of calculating the blend ratio is not performed where an entire one dot is covered with the font region or not entirely covered, a gray-scale font can be created at high speed.

A further explanation will be given for the above two embodiments when the mask pattern representative of the presence of a font is provided separately from the blend ratio.

Figure 10:
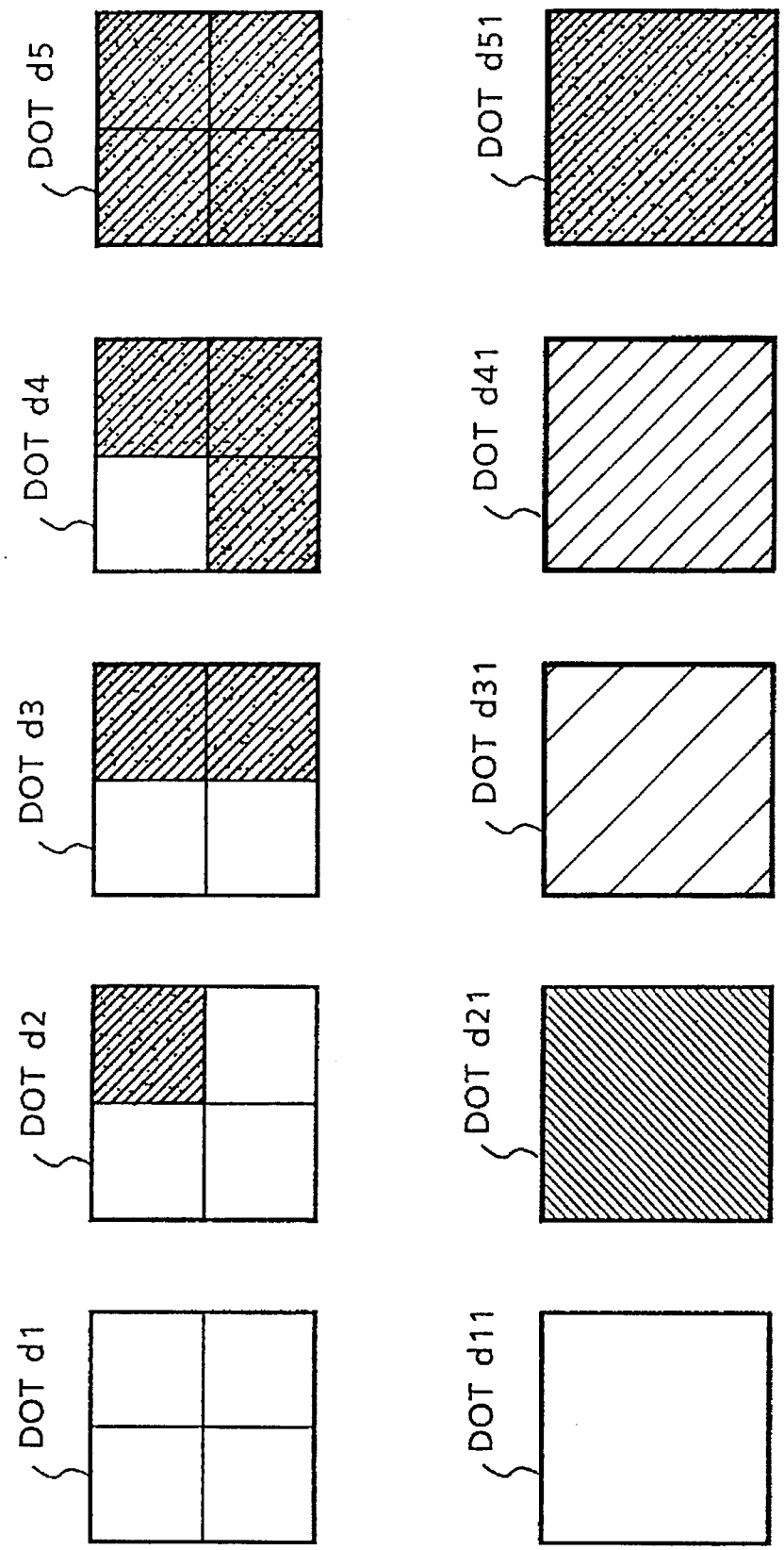
FIG. 10 is a view showing the state of each of the dots virtually displayed in calculating the blend ratio in accordance with the technique according to the present invention.

For example, where a font is output with four gradations, the state of the original dot can be represented by either of the dot states shown in FIG. 10. Now it is assumed that one dot is composed of four sub-pixels, a decision is then made for each pixel as to whether it should be used as a font region, and the proportion occupied by the font region in each dot is calculated as a blend ratio. The blend ratios thus obtained are 0% for dot d1, 25% for dot d2, 50% for dot d3, 75% for dot d4, and 100% for dot d5. These dots are displayed in five manners of dots d11, d21, d31, d41 and d51, respectively. Thus, with the gradation display, the number of bits necessary to manage the blend ratios are 3 bits necessary. For the same reason, the number of bits necessary to manage the blend ratio is 5 bits for 16 gradations, 7 bits for 64 gradations and 9 bits for 256 gradations.

Figure 13A:
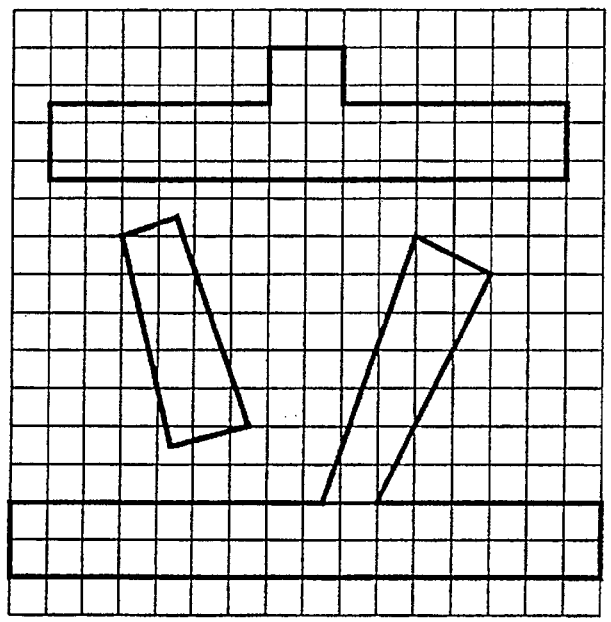
FIGS. 13A and 13B are views showing a typical mask pattern used in the present invention.
Figure 13B:
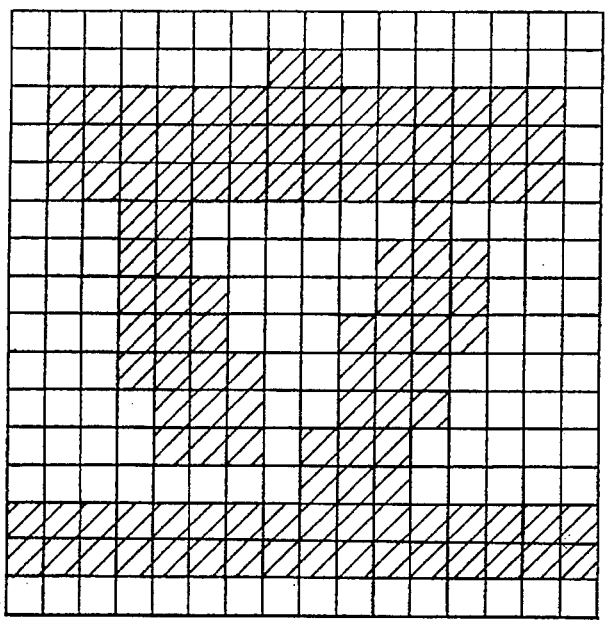
Figure 14:
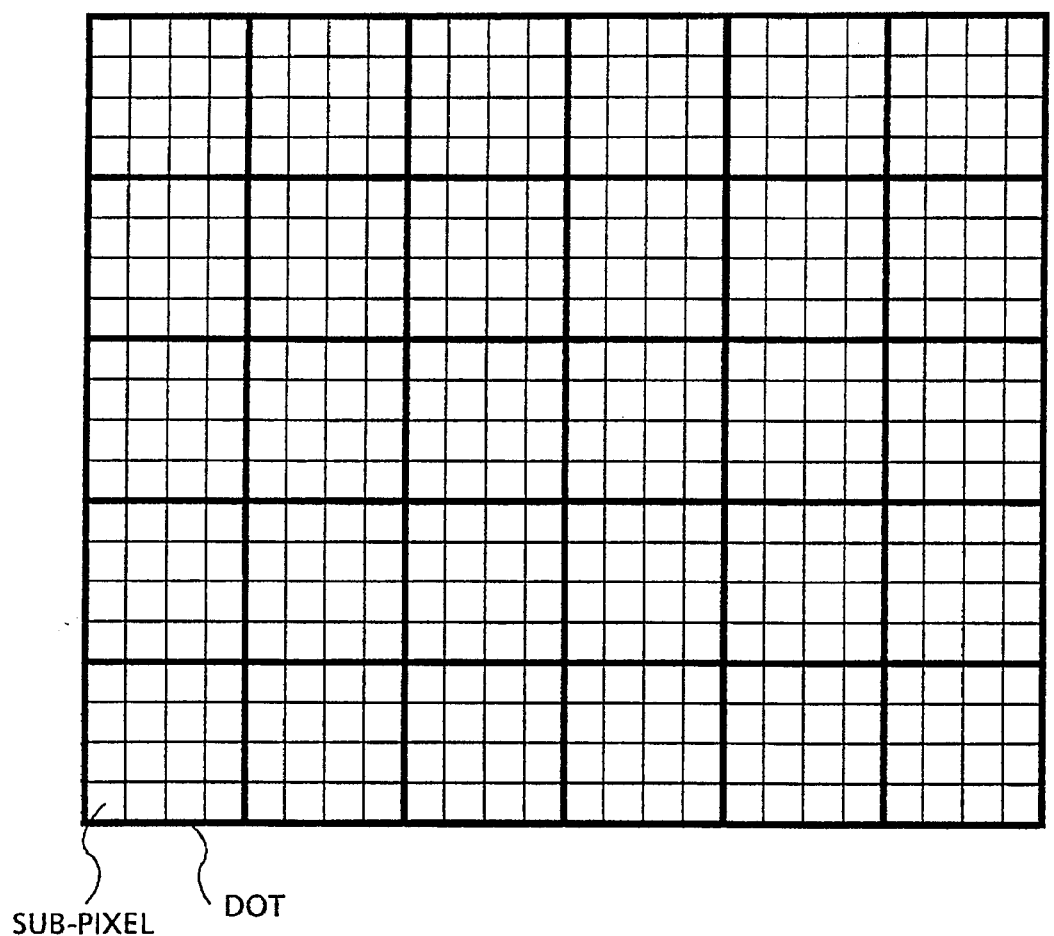
FIG. 14 is a view showing work memory for sub-pixels.

Now, one bit flag is provided for managing the information based on the presence or absence of a font for each of the dots constituting the font. If any part of the font region is located on a dot at issue, the flag is set for 'on', while if no part of the font region is located on the dot, the flag is set for 'off'. Thus, in the case of Kanji " 上 " shown in FIG. 13A, the corresponding mask pattern is such as shown in FIG. 13B. Likewise, in the case of FIG. 10, the font presence information flag is 'off' for dot d1, and 'on' for dots d2, d3, d4 and d5.

In the four gradation display, the font presence information flag is 'off' only if the blend ratio is 0%, and if it is 'on', four kinds of blend ratios of 25%, 50%, 75% and 100% are taken. Thus, if the mask pattern representative of the presence region of a font is provided separately from the blend ratio, the number of bits required to manage only the blend ratio is 2 bits. For the same reason, it is 4 bits for 16 gradations, 6 bits for 64 gradations and 8 bits for 256 gradations.

In accordance with this embodiment, the number of bits for representing the blend ratio can be defined by the number of gradations so that only a necessary and minimum managing amount of information is required; with the 256 gradation display, the blend ratio is expressed by few bits as large as 8 bits. This helps information management and memory reduction.

Where the mask pattern is provided, if the flag is 'off', it is not necessary to perform the processing of calculating the blend ratio. This is convenient to find the dot which does not require the blend ratio calculation processing.

Figure 6:
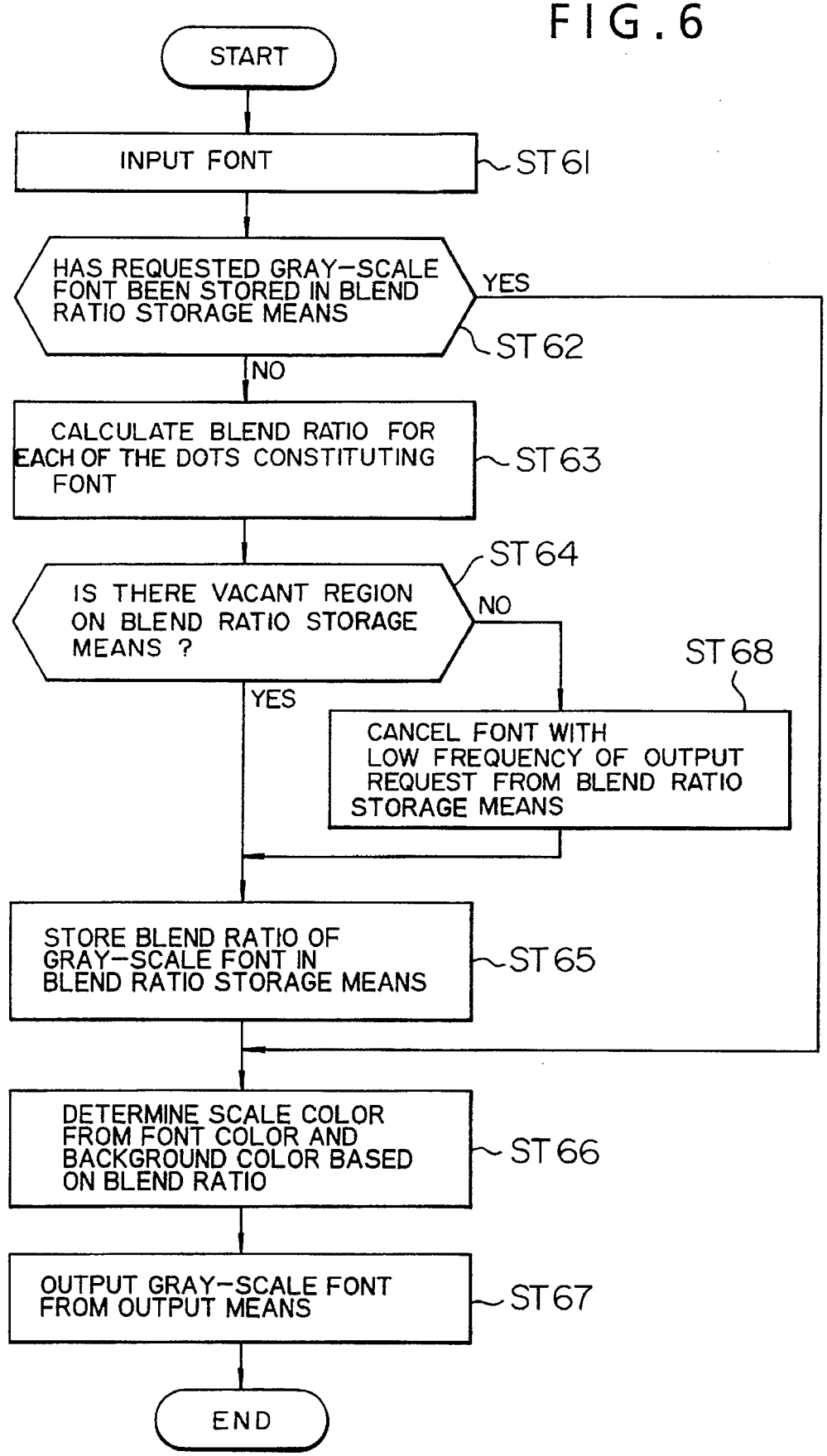
FIG. 6 is a flowchart showing a modification of the first embodiment of the present invention.

Referring to FIG. 6, an explanation will be given of a modification of the first embodiment of the present invention.

In this embodiment, as an application of the previous embodiment, the calculated blend ratios are once stored in the blend ratio storage device 15 and thereafter are used again.

First, in step ST61, a font code is designated. In step ST62, a search is made to determine whether the blend ratios of a required font have already been stored in the blend ratio storage device 15. If the blend ratio for each of the dots constituting the required font has already been stored in the blend ratio storage device 15, in step ST62, a gradation color is determined by the blend ratio information stored in the blend ratio storage device 15, a background color and a font color. If the blend ratio information of a font has not been stored in the blend ratio storage device 15 in step ST63, the blend ratio for each of the dots constituting the font is calculated on the basis of the vector font information.

In step ST64, it is determined whether or not a vacant region for storing the blend ratio information on the font is present in the blend ratio storage device 15. If there is such a vacant region, in step ST65, the blend ratio information is stored on the blend ratio storage device 15. If there is no such vacant region, in step ST68, the font with the lowest frequency of output requirement is retrieved from among the fonts already stored in the blend ratio storage device 15, and the blend ratio information of this font is canceled to assure an available region for storing a new font. Thereafter, in step ST65, the blend ratio information of the font is stored.

In step ST66, a background color and a font color are blended in accordance with the proportion (blend ratio) of a font region in each dot stored in the blend ratio storage device 15, thus determining the gradation color of each dot. In step ST67, the gray-scale font created by the blending device 16 is written in the frame memory 17.

In step ST68, the font with the lowest frequency of output requirement has been retrieved, but the font with the oldest using time can be easily retrieved provided that the using times of the blend ratio information of the fonts stored have been managed.

Namely, the times when the respective fonts were stored in the blend ratio storage device 15 and the stored fonts were used are stored. In canceling a font, the using times stored are searched to cancel the font with the lowest and least recent using frequency.

In accordance with this embodiment, only when output of a font is requested is its calculated blend ratio is stored in the blend ratio storage device, and when output of the same font is requested, that blend ratio is used again. Thus, since redundant processing of calculating the blend ratio is not performed for the same font with the same size, a gray-scale font can be produced at high speed.

Further in accordance with this embodiment, if the blend ratio information of a font is unable to be stored in the blend ratio font storage device 15, the font with the lowest frequency of output requests is canceled to stored a new font. Thus, since the probability (hit ratio) that a desired font is present in the blend ratio storage device 15 can be increased, the gray-scale font can be produced at high speed. Of course the blend ratio may be expressed by a manner other than the above numerical value.

Figure 11:
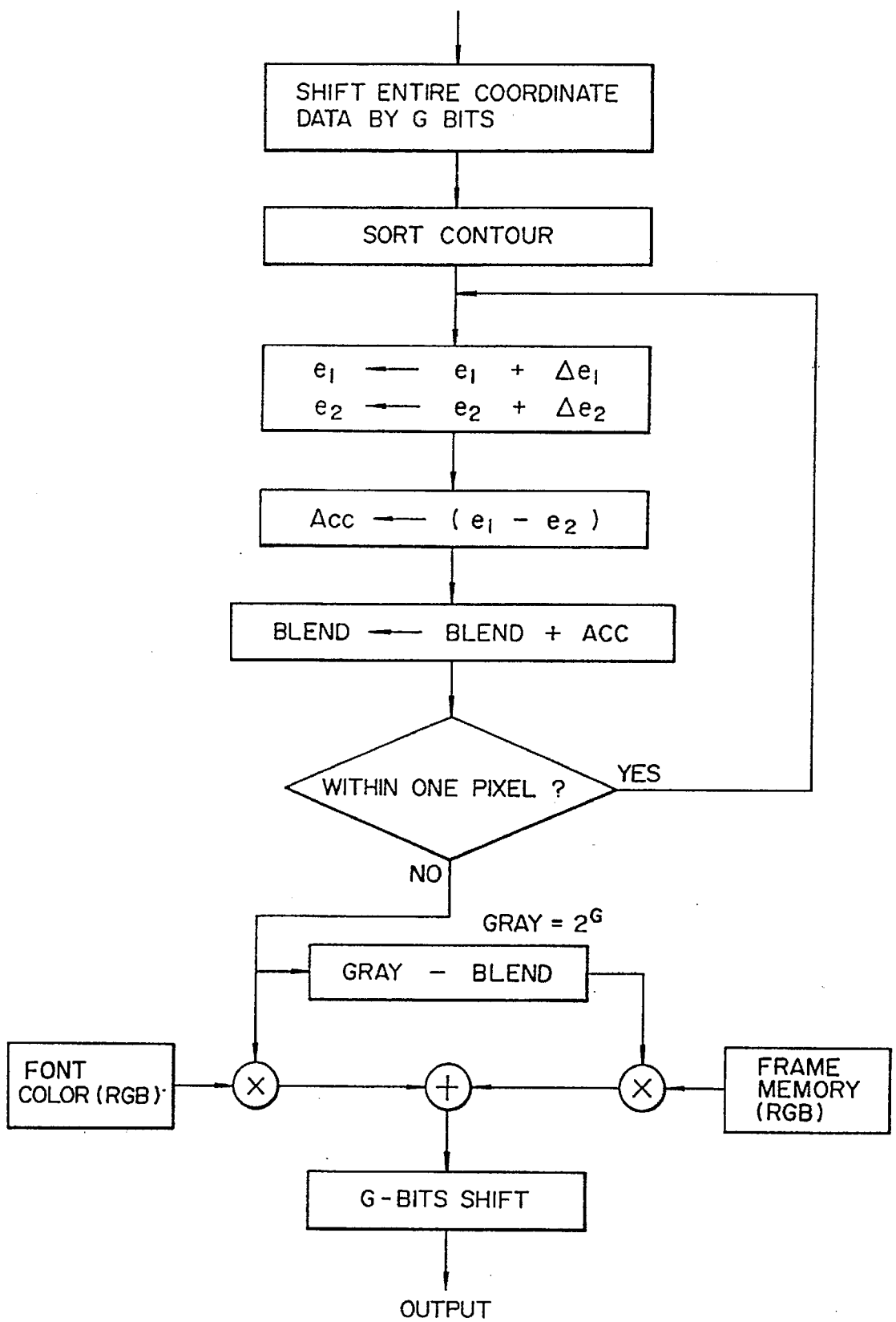
FIG. 11 is a flowchart showing the processing procedure in the second embodiment of the present invention.

Now referring to FIGS. 7 and 11, an explanation will be given of the second embodiment of the present invention in which the above blend ratio calculating processing is not performed by software but rather is incorporated in LSI.

Figure 7:
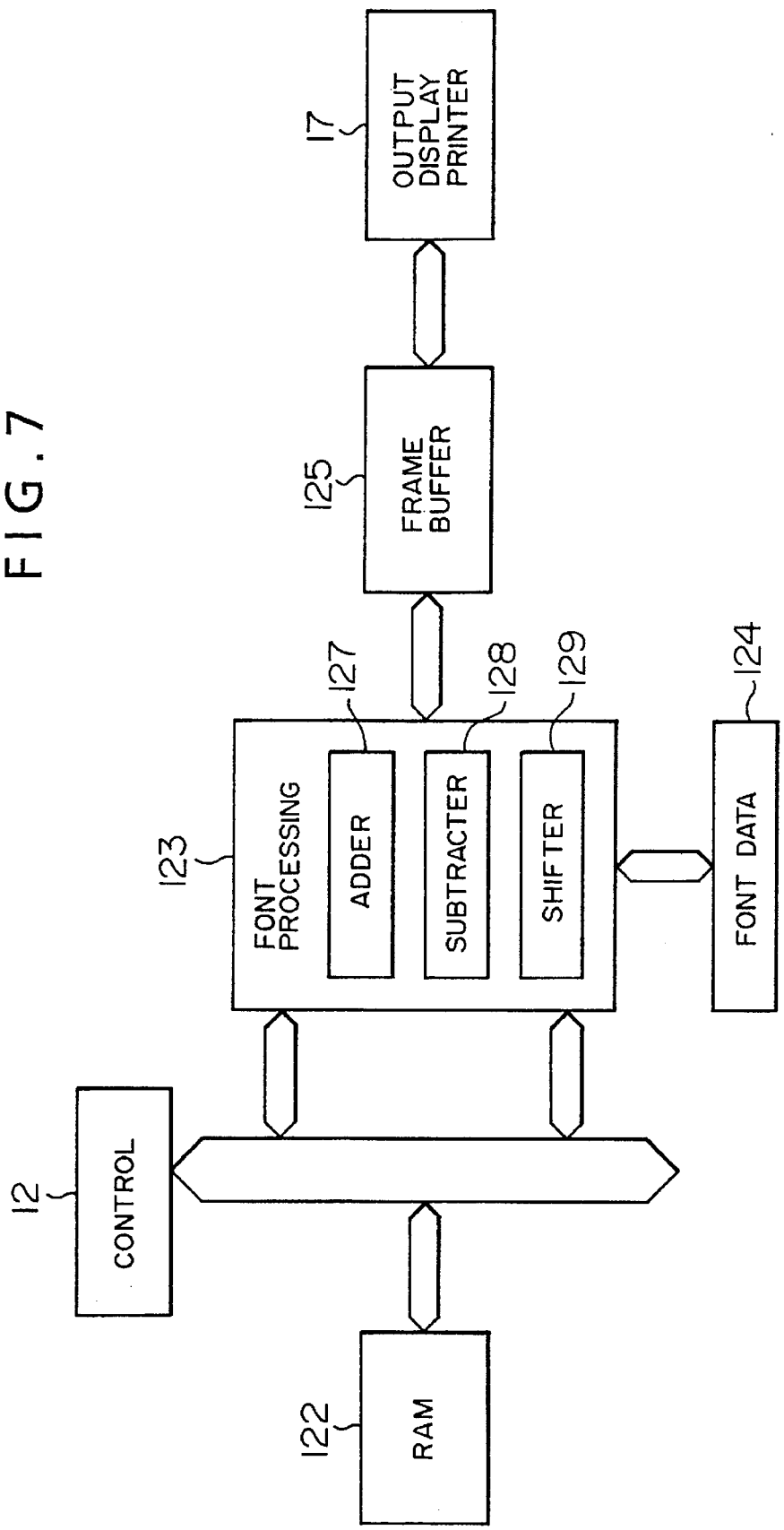
FIG. 7 is a block diagram showing the arrangement of the second embodiment of the present invention.
Figure 8:
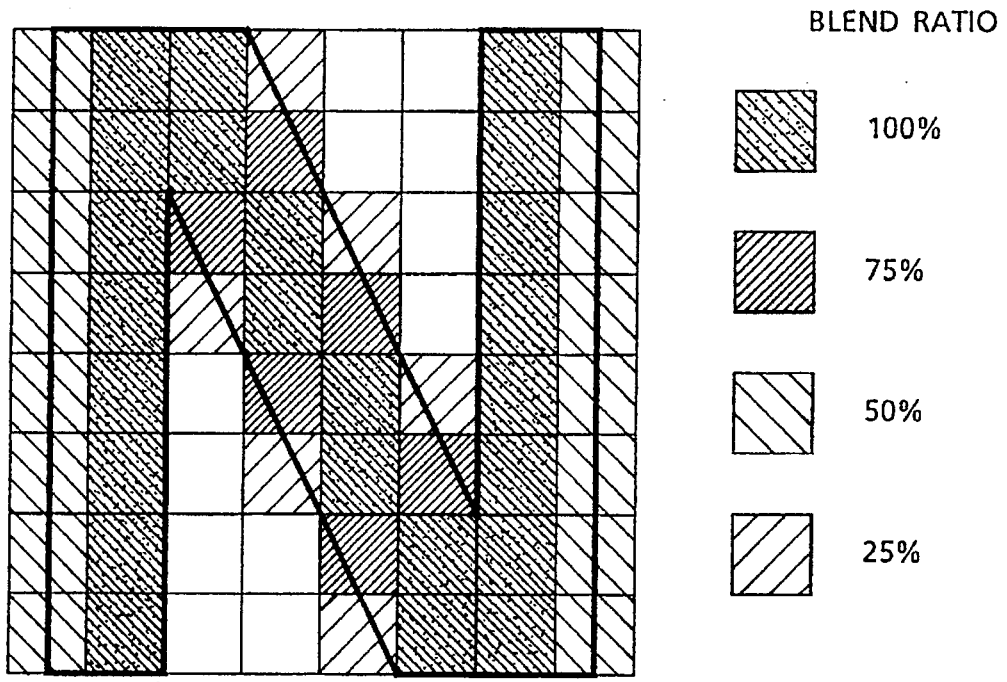
FIG. 8 is an enlarged view of gray-scale display.

FIG. 7 shows a system of the graphic display device which is one example of a data processing device. The system is composed of a control device 12 preferably integrated on a monolithic semiconductor substrate, a RAM 122, a font processing device 123 integrated on the monolithic semiconductor substrate, font data 124, a frame buffer 125, and an output device such as a CRT. Although an input device 11 is not shown, it is actually connected with the control device as FIG. 1.

The control device 12 serves to execute the program stored in the RAM 122 to manage and control the entire system. Namely, in font processing, it transfers a font processing command and parameter information to actuate the font processing device 123.

The font processing device 123 includes an adder 127, a subtracter and a shifter 129. It accesses the font data 124 in accordance with the instruction from the control device 12, and calculates the blend ratio along a predetermined processing procedure to perform the processing on the frame buffer 125.

In this embodiment, it should be noted that the blend ratio of each of the pixels on each color plane in a display device will be stored in the frame buffer 125.

The font processing device 123 calculates the blend ratio in the manner described in connection with the previous embodiments. Referring to FIG. 11, an explanation will be given of a series of processing steps shown in FIG. 5.

First, coordinate data read from the font data 124 is enlarged to a multiple equal to the number of gradations. The number of gradations can be represented by the power of 2 (the g-th power of 2) such as a binary digit, 4 gradations, 16 gradations, 64 gradations and 256 gradations so that the coordinate data are g-bit shifted to be enlarged.

The vector data of the enlarged font is developed. The intersection of points of the contour of the font and individual horizontal lines are calculated and the points are sorted. The intersection of points for the respective horizontal lines can be easily calculated by a subtracter on the basis of the gradient of the font contour.

A strip covers a font region from the calculated intersection of points e1 and e2 (e1>e2). The width of the strip can be expressed by the difference Acc between the two intersection points e1 and e2. Since the coordinate data of the font has been previously enlarged to a multiple equal to the number of gradations, the height of the strip is 1. Thus, the area of the strip can be expressed by the width of the strip Acc and so calculated using a subtracter only.

The total area of the strips is calculated for each pixel. It is acquired by the total (Blend) of the areas of the respective strips so that only an adder has to be used.

Thus, the area occupied by a background is (the area (Gray) of one pixel—Blend). The color of a pixel can be determined by a font color (RGB)×Blend+frame memory (RGB)× (Gray—Blend)

The blend ratio can be calculated by (the total area of strips÷the number of gradations). The number of gradations, which can be expressed by the g-th power of 2, can be easily calculated by only shifting g-bits.

Thus, only addition, subtraction and shifting operation have to be executed to perform the processing of acquiring the blend ratio. For this reason, if the font processing device 123 provided with the adder 127, the subtracter 128 and the shifter 129 are prepared beforehand, the blend ratio can be calculated at a much higher speed than if it were determined by software.

What is claimed is:

1. A gray-scale font generating apparatus, comprising:
   input means for inputting information representative of a font code;
   means for generating horizontal lines for each dot of a font; and means for calculating a gray scale value of the dots and a background region for a contour of shape data of a font corresponding to a character code and for performing gradation display of the font in the calculated gray scale value, wherein said gray scale value is calculated by multiplying vector data corresponding to said input information representative of a character code by the number of gradations, the multiplication being a bit-shift operation generating strips covering a region of the character code based on intersections between a font contour line and a respective one of said scan lines, calculating the total area of said generated strips which is equal to the sum of widths of all of the respective strips and calculating said gray scale value by dividing the total area of said strips by the number of gradations, the division being a bit-shift operation.

2. A gray-scale font generating apparatus according to claim 1, wherein the number of gradations is represented by $2^g$ (g-bits shift).

3. A gray-scale font generating apparatus, comprising:

input means for inputting information representative of a font code;

means for generating horizontal lines for each dot of a font; and means for calculating a gray scale value of the dots and a background region for a contour of shape data of a font corresponding to a character code and for displaying the contour of said shape data of the font in said calculated gray scale value and a region other than a contour in a predetermined gradation, wherein said gray scale value is calculated by multiplying vector data corresponding to said input information representative of a character code by the number of gradations, the multiplication being a bit-shift operation generating strips covering a region of the character code based on intersections between a font contour line and a respective one of said scan lines, calculating the total area of said generated strips which is equal to the sum of widths of all of the respective strips and calculating said gray scale value by dividing the total area of said strips by the number of gradations, the division being a bit-shift operation.

4. A gray-scale font generating apparatus according to claim 2, wherein the number of gradations is represented by $2^g$ (g-bits shift).

5. A gray-scale font generating apparatus, comprising:

input means for inputting information representative of a character code;

font data storage means for storing shape data of a font corresponding to a character code;

means for generating horizontal lines for each dot of said font;

blend ratio calculating means for calculating, by numerical computation, a gray scale value including a proportion occupied by a region of the shape data of said font for each dot thereof, wherein said gray scale value is calculated by multiplying vector data corresponding to said input information representative of a character code by the number of gradations, the multiplication being a bit-shift operation, generating strips covering a region of the character code based on intersections between a font contour line and a respective one of said scan lines, calculating the total area of said generated strips which is equal to the sum of widths of all of the respective strips and calculating said gray scale value by dividing the total area of said strips by the number of gradations, the division being a bit-shift operation;

blending means for creating the gradation information for said each dot on the basis of said proportion included in said gray scale value calculated by said blend ratio calculating means; and output means for outputting the gradation information for each dot created by said blending means.

6. A gray-scale font generating apparatus according to claim 5, further comprising blend ratio storage means for storing the proportion calculated by said blend ratio calculating means.

7. A gray-scale font generating apparatus according to claim 6, wherein said blend ratio calculating means calculates a total of areas of rectangles covering a font region in a same direction for each dot and calculates the area occupied by the font region in each dot in relation to the calculated total area to calculate said proportion included in said gray scale value.

8. A gray-scale font generating apparatus according to one of claims 7, further comprising means for holding a mask pattern representative of a region of a rendered image.

9. A gray-scale font generating apparatus according to one of claims 6, further comprising means for holding a mask pattern representative of a region of a rendered image.

10. A gray-scale font generating apparatus according to claim 5, wherein said blend ratio calculating means calculates a total of areas of rectangles covering a font region in a same direction for each dot and calculates an area occupied by the font region in each dot in relation to the calculated total area to calculate said proportion included in said gray-scale value.

11. A gray-scale font generating apparatus according to one of claims 10, further comprising means for holding a mask pattern representative of a region of a rendered image.

12. A gray-scale font generating apparatus according to one of claims 5, further comprising means for holding a mask pattern representative of a region of a rendered image.

13. A gray-scale font generating apparatus according to claim 5, wherein the number of gradations is represented by $2^g$ (g-bits shift).

* * * * *